(12) United States Patent
Neyman

(10) Patent No.: US 6,731,626 B1
(45) Date of Patent: May 4, 2004

(54) TELEPHONY INTELLIGENCE IN A DATA PACKET NETWORK

(75) Inventor: Igor Neyman, Palo Alto, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 09/199,135

(22) Filed: Nov. 24, 1998

Related U.S. Application Data

(62) Division of application No. 09/191,276, filed on Nov. 12, 1998, now Pat. No. 6,459,697.

(51) Int. Cl.[7] .......................... H04L 12/66; H04L 12/28
(52) U.S. Cl. .................... 370/352; 370/400; 379/88.17
(58) Field of Search ............................ 370/352–356, 370/401, 389, 410, 400; 379/88.17, 88.18, 219

(56) References Cited

U.S. PATENT DOCUMENTS

| | | | | | |
|---|---|---|---|---|---|
| 5,915,001 A | * | 6/1999 | Uppaluru | ................. | 379/88.22 |
| 6,014,379 A | * | 1/2000 | White et al. | ................. | 370/389 |
| 6,038,293 A | * | 3/2000 | McNerney et al. | ....... | 379/88.16 |
| 6,078,583 A | * | 6/2000 | Takahara et al. | ............ | 370/356 |
| 6,097,804 A | * | 8/2000 | Gilbert et al. | ............... | 370/352 |
| 6,122,364 A | * | 9/2000 | Petrunka et al. | ............. | 370/353 |
| 6,134,235 A | * | 10/2000 | Goldman et al. | ........... | 370/352 |
| 6,175,562 B1 | * | 1/2001 | Cave | ........................... | 370/352 |
| 6,195,357 B1 | * | 2/2001 | Polcyn | ........................ | 370/354 |
| 6,243,379 B1 | * | 6/2001 | Veerina et al. | .............. | 370/401 |
| 6,366,658 B1 | * | 4/2002 | Bjornberg et al. | ........ | 379/88.18 |
| 6,385,646 B1 | * | 5/2002 | Brown et al. | ................ | 379/219 |

* cited by examiner

*Primary Examiner*—Min Jung
*Assistant Examiner*—Andy Lee
(74) *Attorney, Agent, or Firm*—Donald R. Boys; Central Coast Patent Agency, Inc.

(57) ABSTRACT

A packet-data network is made intelligent in the sense of a connection-oriented, switched telephony (COST) network by enhancing one or more interconnected IP routers in the network with computer-telephony integration (CTI) processors executing CTI applications. No-charge-to-calling-party IP addresses are assigned and sponsored by various enterprises, who may also maintain call centers having at least one CTI-enhanced IP router connected to the network, and agent stations having IP telephones connected to the call-center-located IP router. With appropriate software and the CTI link to IP routers the performance of well-known conventional telephone systems may be provided in packet networks like the Internet.

8 Claims, 3 Drawing Sheets

TELEPHONY INTELLIGENCE IN A DATA PACKET NETWORK

This application is a division of application Ser. No. 09/191,276, filed Nov. 12, 1998, now U.S. Pat. No. 6,459,697.

FIELD OF THE INVENTION

The present invention is in the art of telecommunications including data-network-telephony (DNT) which encompasses Internet-protocol-network-telephony (IPNT), and pertains more particularly to methods and apparatus for providing platform-independent intelligence to routing nodes and servers within a DNT network.

CROSS-REFERENCE TO RELATED DOCUMENTS

The present invention is related to U.S. Pat. No. 08/947,043 entitled Uniform Control of Mixed Platforms in Telephony, now U.S. Pat. No. 6,181,788 filed on Oct. 8, 1997, which is incorporated herein in it's entirety by reference. The present invention is also related to U.S. application Ser. No. 08/948,554, Entitled Uniform Control of Mixed Platforms in IPNT Telephony, now U.S. Pat. No. 5,970,065 filed Oct. 10, 1997, also incorporated in its entirety by reference.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regards to client satisfaction. Such computer-enhanced telephony is known in the art as computer-telephony integration (CTI).

Generally speaking, CTI implementations of various design and purpose are implemented both within individual call-centers and, in some cases, at the telephone network level. For example, processors running CTI software applications may be linked to telephone switches, service control points (SCP), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI and other hardware within a call-center is commonly referred to as customer premises equipment (CPE). It is the CTI processor and application software is such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display unit's (PC/VDU's) so that agents manning such stations may have access to stored data as well as being linked to incoming callers by telephone equipment. Such stations may be interconnected through the PC/VDUs by a local area network (LAN). One or more data or transaction servers may also be connected to the LAN that interconnects agent stations. The LAN is, in turn, connected to the CTI processor, which is connected to the call switching apparatus of the call center.

When a call arrives at a call center, whether or not the call has been pre-processed at an SCP, typically at least the telephone number of the calling line is made available to the receiving switch at the call center by the network provider. This service is available by most networks as caller-ID information in one of several formats such as Dialed Number Identification Service (DNIS). If the call center is computer-enhanced (CTI) the phone number of the calling party may be used as a cross-reference key to access additional information from a customer information system (CIS) database at a server on the network that connects the agent workstations. In this manner information pertinent to a call may be provided to an agent, often as a screen pop, and in some cases prior to a call being connected to the agent.

Proprietorship of CTI equipment both at individual call-centers and within a telephone network can vary widely. For example, a phone company may provide and lease CTI equipment to a service organization hosting a number of call-centers. A telecommunications company may provide and lease CTI equipment and capability to an organization hosting call centers. In many cases, a service organization (call center host) may obtain and implement it's own CTI capability and so on.

In recent years, advances in computer technology, telephony equipment, and infrastructure have provided many opportunities for improving telephone service in publicly-switched and private telephone intelligent networks. Similarly, development of a separate information and packet data network known as the Internet, together with advances in computer hardware and software have led to a new multi-media telephone system known in the art by several names. In this new systemology, telephone calls are simulated by multi-media computer equipment, and data, such as audio data, is transmitted over data networks as data packets. In this application the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional system is familiar to nearly all, and is often referred to in the art as Plain Old Telephony Service (POTS). In the POTS system calls are connection oriented lending to the preferred terminology, connection-orientated-switched-telephony or COST. The COST designation will be used extensively herein when describing typical connection orientated networks or calls.

The computer-simulated, or DNT systems, are familiar to those who use and understand computer systems. Perhaps the best example of DNT is telephone service provided over the Internet, which will be referred to herein as Internet Protocol Network Telephony (IPNT), by far the most extensive, but still a subset of DNT. DNT is a term used to describe basically any type of packet switched network whether public or private. Examples of DNT networks include the public Internet, Intranets, private company owned wide area networks (WANs), and so on. These DNT networks may operate using several differing or combined protocol, but generally are supportive of DNT.

Both systems use signals transmitted over network links. In fact, connection to data networks for DNT such as IPNT is typically accomplished over local telephone lines, used to reach such as an Internet Service Provider (ISP). The definitive difference is that COST telephony may be considered to be connection-oriented as previously described. In the COST system, calls are placed and connected by a specific dedicated path, and the connection path is maintained over the time of the call. Bandwidth is thus assured. Other calls and data do not share a connected channel path in a COST system. A DNT system, on the other hand, is not connection oriented or dedicated in terms of bandwidth. That is, data, including audio data, is prepared, sent, and received as data packets. The data packets share network links, and may travel by varied and variable paths.

Under ideal operating circumstances a DNT network, such as the Internet, has all of the audio quality of conventional public and private intelligent telephone-networks, and many advantages accruing from the aspect of direct computer-to-computer linking. However, DNT applications must share the bandwidth available on the network in which they are traveling. As a result, real-time voice communication may at times suffer dropout and delay (latency). This is at least partially due to packet loss experienced during periods of less-than-needed bandwidth which may prevail under certain conditions such as congestion during peak periods of use, and so on.

Recent improvements to available technologies associated with the transmission and reception of data packets during real-time DNT communication have enabled companies to successfully add DNT, principally IPNT capabilities to existing CTI call centers. Such improvements, as described herein and known to the inventor, include methods for guaranteeing available bandwidth or quality of service (QoS) for a transaction, improved mechanisms for organizing, coding, compressing, and carrying data more efficiently using less bandwidth, and methods and apparatus for intelligently replacing lost data via using voice supplementation methods and enhanced buffering capabilities.

In typical call centers, DNT is often accomplished via Internet connection wherein IPNT calls may be placed or received. Call centers may also be linked to sub-networks, including private networks that are linked to the Internet. Data packets arrive at the call center after having traveled from node-to-node through the DNT network or networks, and must be sorted and simulated at the call center on a PC/VDU (computer with display), or DN-capable telephone. DNT-capable call centers are more appropriately termed communication centers in the art because of the added scope of media possibilities presented therein. Therefore, the term communication center will be used extensively hereinafter when describing a call center.

In systems known to the inventors, incoming IPNT calls are processed and routed within an IPNT-capable call-center in much the same way as COST calls are routed in a CTI-enhanced center, using similar or identical routing rules, waiting queues, and so on, aside from the fact that there are two separate networks involved. Call centers having both CTI and IPNT capability utilize LAN-connected agent-stations with each station having a telephony-switch-connected headset or phone, and a PC connected, in most cases via LAN, to the network carrying the IPNT calls. Therefore, in most cases, IPNT calls are routed to the agent's PC while conventional telephony calls are routed to the agent's conventional telephone or headset. Typically separate lines and equipment must be implemented for each type of call weather COST or IPNT.

Much has been accomplished with regard to increasing the intelligence and capability of COST telephony at the network level before calls arrive at a call center. However, no such inroads have been made with regard to DNT telephony at network level. This is in part due to the nature of data-packet networks wherein data travels by varied and variable routes. Generally speaking, routing within a DNT network is indiscriminate from node to node with only the next destination address of the next node as a routing guideline for individual packets.

In COST systems known to the inventor, intelligent routing rules have been extended into the public network domain principally via the addition of CTI processing capability at the network level. For example, SCPs may be enhanced with a processor running varied software routines adapted to increase intelligence in call handling. Intelligent peripherals, statistical servers, transactional servers, and the like give added control regarding call handling to individual communication centers that support complimentary equipment and software.

Of particular notice is the recent implementation of T-server function (known to the inventor) within COST networks allowing the communication center to exert control over standard telephony switches and routers involved in routing both incoming and outgoing communication. The CTI processor renders the proprietary nature of many of these switches and routers as a non-factor with regards to compatibility with each other. Hence, the implementation renders systems platform-independent. These CTI Processors, known to the inventors as T-server functions (largely software) installed in the switch or router-connected processors can communicate with each other via a separate digital network that links the processors and routers to each other and to similar equipment in the communication center. In this way, call identification, destination verification, importance or priority of the call, and who best to deliver the call to may be decided before the call arrives in the domain of the communication center. Moreover, information about the call and the calling party may be routed ahead of the actual call so that agent's are better prepared to handle the call.

As more and more telephony is being practiced over switched-packet data networks, it becomes desirable to enhance such networks with added intelligence so that calls may be routed intelligently in much the same way as in a COST network. Recent advances in technology have made it possible to convert COST calls to DNT format and vice versa, however, systems known to the inventor to have this capability are lacking in intelligence on the DNT network side with regards to further routing of calls.

What is clearly needed is a method and apparatus that would provide a controllable intelligence to switches and routers within a DNT network so that calls originating from either a data-packet network, or a COST network may be routed intelligently and in a platform independent fashion according to communication center rules. Such method and apparatus would do much to revolutionize the way that DNT is practiced as well as further aid in seamless integration between COST and DNT networks.

SUMMARY OF THE INVENTION

In a preferred embodiment of the present invention an intelligent data-network telephony (DNT) packet-data network is provided, comprising a first IP Router connected to the packet-data network; a computer-telephony integration (CTI) server connected to the first IP router by a dedicated data link enabling monitoring of transactions at the IP Router and manipulation of IP Router functions; and telephony applications executing on the CTI Server. The executing applications provide a Service Control Point (SCP) for preprocessing and further routing of incoming DNT calls at the first IP Router.

In some embodiments, associated with the CTI-enhanced IP router, there is a DNT-capable Interactive Voice response (IVR), wherein the SCP connects the callers on the incoming DNT calls to the IVR, which elicits information from the callers, and the SCP uses the elicited information to further route the calls.

In some embodiments there is further a protocol-translating bridge connected on the network and to a dedicated-connection, switched telephony (COST) network, wherein calls after IVR processing, based on the elicited information, are routed over the bridge and into the COST network. The DNT network can be the Internet, as well as other known data-packet networks. Further, in the case of interconnection with a COST network, the COST network can be any publicly-switched telephony network (PSTN).

In various embodiments there may be multiple instances of IP routers enhanced by CTI servers executing CTI applications, providing thereby intelligent routing of DNT calls at multiple points and levels. Further there may be at least one call center implemented at a customer premise, the call center comprising a second IP router enhanced by a CTI processor, the second IP router connected to the DNT network and to plural agent stations each having an IP-capable telephone coupled to the IP router; wherein a call routed by the SCP to the second IP router may be further routed by action of the CTI processor to an agent at a selected one of the agent stations.

In thew case of enterprise-hosted DNT call centers, the IP-capable telephones may be implemented on computer stations having video display units (PC/VDUs) at the agent stations, and the PC/VDUs may be coupled to the second IP router and to the CTI processor by a local area network (LAN).

In addition to the apparatus, methods are also disclosed for practicing the invention in various embodiments, and all is disclosed below in enabling detail, enabling one of ordinary skill in the art to practice the invention.

BRIEF DESCRIPTION OF THE DRAWING FIGURES

DESCRIPTION OF THE PREFERRED EMBODIMENTS

According to a preferred embodiment of the present invention, a method and apparatus is provided for enhancing a DNT network with platform-independent call-routing intelligence that is controllable from within participating communication centers. Such enhancement is made possible through the implementation and distribution of an innovative instance of firmware and software at key locations within a DNT network whereby communication between such described instances and at least one such instance installed within a communication center is achieved via a separate and dedicated digital network. The system described in further detail below allows platform-independent routing of calls over a DNT network according to intelligent communication center rules, emulating the intelligence of the well-known COST systems provided by existing telephone network providers, and as defined above in the Background section.

Figure 1:
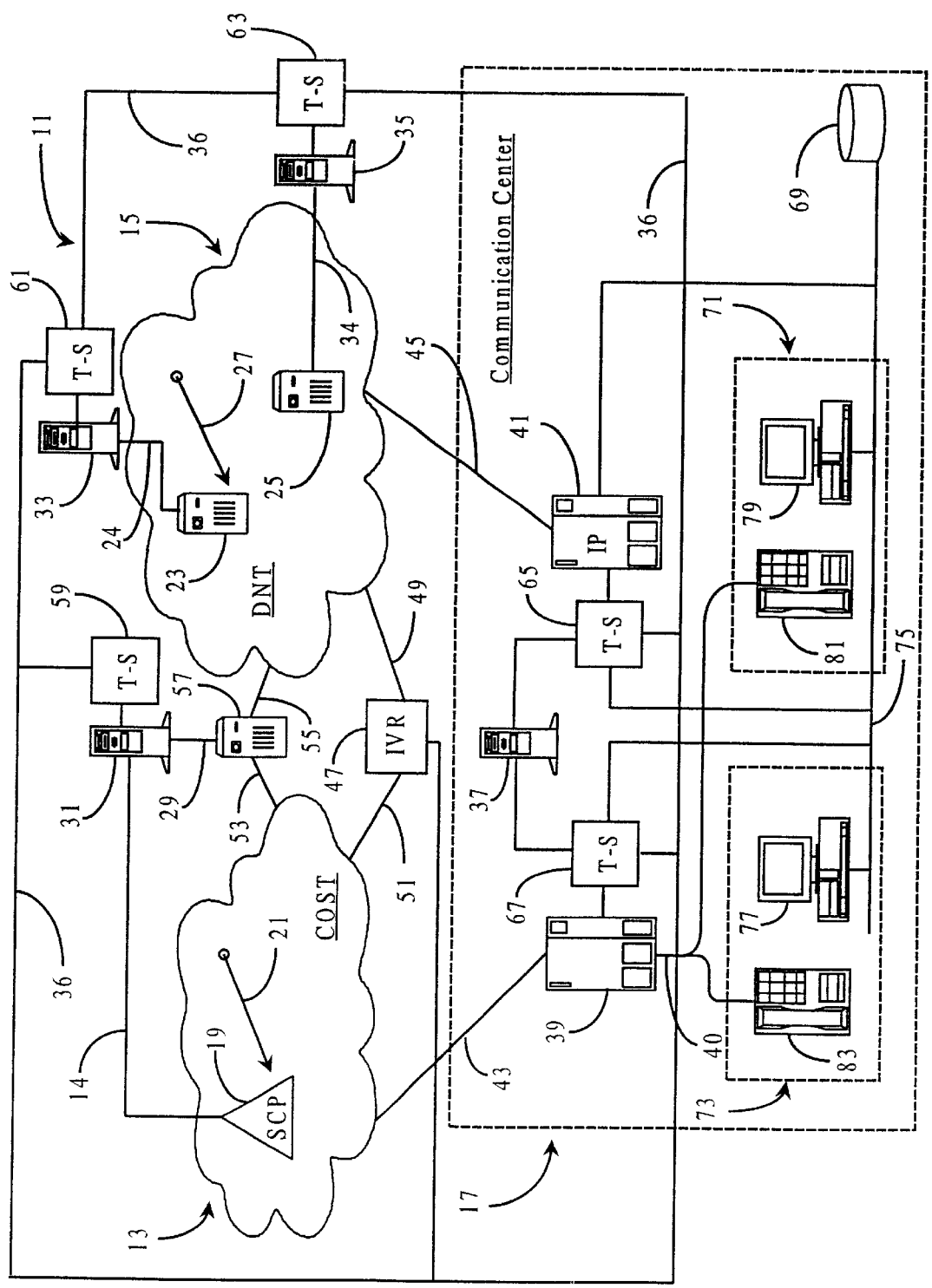
FIG. 1 is an overview of an enhanced communication network and connections according to an embodiment of the present invention.

FIG. 1 is an overview of an enhanced communication network and connections according to an embodiment of the present invention. A communication network 11 is illustrated and comprises a COST net-work 13, a DNT network 15, and a communication center 17. COST network 13 may be of the form of the PSTN network, a private telephony network, or any other type of COST network as may be known in the art. DNT network 15 may be of the form of the Internet, an Intranet, a private WAN, or any other type of switched-packet network over which DNT may be practiced. Communication center 17, for exemplary purposes, is a call center hosted by a commercial enterprise, and the equipment illustrated therein is illustrated as customer-premises equipment (CPE).

A Service Control Point (SCP) 19 is illustrated within COST network 13, and is adapted to receive COST calls represented via a vector 21 from anywhere in COST network 13. Such SCP functionality is well-known in the telephony arts. CTI equipment such as a CTI processor running instances of intelligent routines may be assumed to be present within COST network 13 and connected to SCP 19, and much such enhancement is not public domain, but proprietary to various organizations. There may be more than one CTI-enhanced SCP within COST network 13 without departing from the spirit and scope of the present invention. However the inventor chooses to illustrate only one for the purpose of simplifying explanation.

DNT network 15 shows two DNT IP nodes, node 23, and node 25. Such nodes are typically termed IP Routers in the art, and are commercially supplied by a number of vendors, such as Ascend Corporation and others. The term "routers" may be confusing in the present specification without some further explanation. The term as applied to IP Routers, such as routers 23 and 25, refers to relatively "dumb" machines that receive and forward data packets. The term "router" as applied in intelligent COST networks means a switching system capable of applying intelligent routing rules, typically retrieving and using extensive stored data. Efforts will be made herein to keep the distinction clear.

Nodes 23 and 25 are adapted for receiving and forwarding data packets from any network connected source, and such packets may well be DNT packets. Such DNT calls are represented via a vector 27 shown incoming to IP node 23. Nodes 23 and 25 represent typical DNT routing nodes in that they may be of varied proprietorship and varied functionality as a result. IP nodes of different manufacture are typically capable of receiving and routing data packets in a network protocol, but may vary widely in further and enhanced functionality.

In typical description, such nodes are often used for simple routing of data. Other types of nodes that may be present within DNT network 15 include server nodes adapted to serve requested information, such as an e-mail server or file server. Still other types of nodes may be interactive servers such as are used in conjunction with Internet chat rooms or the like. For the purpose of the present invention, nodes 23 and 25 are data routing nodes. However, in another embodiment, they may be multifunctional nodes.

In a DNT network such as network 15, each connected node has a unique address that identifies it's location in the network. One node may have more than one address, though typically, this is not the case. This unique address is used as a sort of phone number or destination number for data packets traveling in the network. On the Internet, these addresses are known as IP addresses. IP addresses are not to be confused with universal resource locators (URL's) which may be used to access specific served information such as a WEB page stored on a sever node. An IP address specifically locates a machine (node) connected to the network, and may be used to direct data packet traffic from one node to another.

As is known in the art, data packets are routed through a DNT network from node to node (from IP address to IP address). There may be many nodes along an extended data path wherein data-packets pause for further routing or may be redirected by such as address translation. Such node pauses, as experienced by traveling data-packets, are often termed "hops" in the art. For example, an IPNT call from a source computer may make many pauses (or hops) at such nodes before reaching a final IP address. In some cases, the final address will be an interactive server for linking two participants using a DNT application. In other cases, connection will be made from a source computer to a recipient computer (direct linking).

Referring back now to FIG. 1, nodes 23 and 25 each have a convention listing a number of IP addresses to other connected and compatible nodes within DNT network 15 for the purpose of mapping routes through the network toward the final destination of a particular data event. One node may contain many addresses of compatible nodes and has a limited ability to determine the best map or route to the next node based on, among other criteria, current network conditions including known bandwidth capability, supplied information within the arriving data packet, recent additions or upgrades to the network, and so on. Some systems also employ special software known as Quality-of-Service (QoS) software for prioritizing traffic and reserving bandwidth in some cases. The above described criteria and current art methods for using this criteria in data-packet routing is well-known in the art. Therefore much detail will not be provided except to note that in current routing methods, multiple data-packets associated with a single event are often routed to the destination via differing nodes along variable paths.

In order to provide special routing intelligence, in the sense of routing intelligence as known in COST networks, to IP nodes 23 and 25, innovative data routers termed intelligent data-routing processors (IDRPs) by the inventors are provided and connected in a geographically distributive fashion within DNT network 15 and at connected communication centers such as communication center 17. For example, an IDRP 35 is connected to IP node 25 via data link 34, while IP node 23 is connected to an IDRP 33 via a data link 24. IDRPs 33 and 35 are each running an instance of a CTI application suite known to the inventor as T-server (T-S) 61 and T-S 63 respectively. An IDRP such as IDRP 33, for example, is adapted to exert control over the functions of IP node 23 over the connecting data link. The IDRP monitors all activity of the IP Node (arriving data packets, IP addresses, header information, etc.), and is also adapted to exert control over operations of the connected IP router. Similar equipment and software (IDRPs/T-S routines) are also implemented within connected communication centers such as center 17, and at gateway locations between separate networks such as at a signaling system 7 (SS7) gateway 57 illustrated between COST network 13 and DNT network 15.

An SS7 gateway 57 is connected to an IDRP 31 running an instance of T-S 59 via data link 29. IDRP 31 is also connected to SCP 19 within COST network 13 via a CTI connection 14. In this case, IDRP 31 communicates both to gateway 57 and to SCP 19, thus setting it apart from IDRPs 33 and 35 in terms of dedicated function. It will be assumed for the purposes of the present invention that an IDRP connected to a gateway such as gateway 57 will have a stated variance in function by virtue of the equipment it is adapted to control and by virtue of T-S routine. In this case, T-S 59 will be variant in terms of specific command function from other T-S routines. Hence, T-S routines as a rule, are written specifically for the type of switch/router/gateway that they will control, and not all instances of a T-S are exactly alike. More specifically, T-S 59 will be written so as to provide command control to SCP 19 which comprises a network telephone switch, and also to SS7 gateway 57 which, in effect, is a digital converter which is adapted to convert Bellcore protocol signal from COST network 13 into data-packets and also data-packets from DNT network 15 to Bellcore signal protocol. It is to be understood that the SS7 gateway illustrated is exemplary, and similar gateways may be used translating between COST networks and DNT networks wherein different protocols than those described here are used.

An IDRP 37 illustrated within communication center 17 acording to the distributive architecture as described above, is running seperate instances of T-S software, namely T-S 67 adapted to control a CTI switch 39 over a CTI connection, and T-S 65 adapted to control an IP switch 41 for, in this case, IPNT traffic. In this arrangement, communication center 17 is adapted to handle both COST and DNT communication accountng for the added equipment. It will be apparent to the skilled artisan that elements 37, 67, and 65 may be shown as a single element, as all of the software functions may execute on a single processor.

According to an embodiment of the present invention, a seperate digital network 36 connects all of the IDRPs runnning instances of T-S software in the illustrated system. In this example, connection is illustrated as being between seperate instances of T-S routine such as between T-S 63, and T-S 61 for illustrative purpose only. In actual practice, the hard connections are made to various IDRPs via compatable ports installed or provided therein. Digital network 36 may be a privately owned or leased network and is specifically dedicated to providing a communicative link between each distributed IDRP such as IDRPs 31 and 37.

As an intelligent network, IDRPs on network 36 are provided with all of the knowledge regarding DNT network conditions such as available routes, bandwith availability, IP addressing of similar IDRPs and connected nodes. Other intelligence includes the corporate identification and routing rules generic to participating companies hosting communication centers.

In the embodiment illustrated an innovative intelligent peripheral in the form of a dual-ported IVR 47 is provided and uniquely adapted to receive and interact with certain calls from both COST network 13 and DNT network 15 for the purpose of interacting with callers from either network that are destined to connected communication centers such as center 17. More specifically, IVR 47 is intended to be a first caller-interface or intercept for communication center 17 regarding callers from both networks. The IVR functions are well-known in COST networks as associated with SCPs for the purpose of providing routing of toll-free (800, 888) calls. For example, COST calls 21 arriving at SCP 19 are routed to IVR 47 over COST trunk 51. DNT calls 27 arriving at IP node 23 and requiring IVR are routed to IVR 47 over DNT connection 49. Callers from both networks may be given special numbers to call such as a 1-800 number (COST), or a DNT equivalent such that by using that number, IDRP 31 may recognize the call and route to IVR 47.

IVR 47 is, in this embodiment, dedicated for the purpose of interaction with callers through known methods such as via voice response, touch tone, or the like. It will be appreciated that IVR 47 may be enhanced to interact with DNT callers via added function such as typed text, interactive options offered on a WEB form, or other known methods such as are attributable to data networks and servers. Information obtained from interaction with IVR 47 may include caller ID, call destination, purpose of call, priority of call, and so on. In either instance, additional information obtained through IVR 47 is communicated to respective nodes/switches and can be interpreted via IDRP control. For example, interaction data regarding a COST caller resides in SCP 19 which is under control of IDRP 31. Interaction regarding a DNT caller resides at an IP node such as node 23 in this instance, which is under control of IDRP 33.

IVR 47, serving both networks, is, in this embodiment, also connected to communication network 36, and using this network, may communicate with T-S at other locations in the overall system. It is necessary, for example, in interacting with COST callers, for the elicited information, or instructions derived therefrom, to be communicated to SCP 19 for routing purposes. In the case of the DNT network, the equivalent functionality may be achieved either by the network 36 or via the packet data network 15.

Within communication center 17, which, as previously described, can handle both COST and DNT calls, is illustrated a telephony switch 39 adapted to receive COST calls from COST network 13 via a trunk connection 43. Two agent workstations (there may be many more), workstation 73 and workstation 71 are adapted to include individual COST telephones 83, and 81 respectively. Cost phones 83 and 81 are connected to switch 39 via internal extension wiring 40. Workstations 73 and 71 are also adapted to include PC/VDU's 77 and 79 respectively. PC/VDU's 77 and 79 are connected to each other via a local-area-network (LAN) 75, and further connected via LAN 75 to an IP switch 41. IP switch 41 is adapted to receive incoming DNT calls from DNT network 15 via DNT connection 45. A customer information system (CIS) repository 69 is connected to LAN 75 and is therefore accessible to agents at workstations 73 and 71. CIS repository 69 contains stored information regarding callers such as addresses, credit history, product preferences, purchase history, and so on. Such data along with DNT events may be displayed on LAN-connected PC/VDU's such as PC/VDU 77 and PC/VDU 79.

IDRP 37 monitors and controls both IP switch 41 (DNT) and telephony switch 39 (COST) via T-S 65 and T-S 67 respectively. IDRP 37 is also connected to digital network 36 (connectivity illustrated through T-S). Each instance of T-S (67 and 65) is illustrated as LAN-connected (connections not numbered). In actual practice, T-S routines 67 and 65 may reside in IDRP 37 and the hard connections would be from IDRP 37 direct to each communications switch (two connections), from IDRP 37 to LAN 75 (one connection), and from IDRP 37 to digital network 36 (one connection). Separate or dual connections represented to LAN 75 and digital network 36 by way of separate instances if T-S are illustrative only and merely identifies two specific instances of T-S within IDRP 37.

Data regarding a caller obtained via IVR 47, whether from a DNT call or a COST call, may be sent to communication center 17 ahead of a call with respect to either network via digital network 36. For example, a command from IDRP 31 to SCP 19 may be to route a COST call, after interaction with IVR 47, to telephony switch 39 in communication center 17 via COST connection 43 while the data regarding the call is routed to IDRP 31, which than passes the data onto LAN 75 and ultimately to an agent's PC/VDU such as PC/VDU 79. Similarly, a DNT call, after interaction with IVR 47, may be routed from IP node 23 to IP node 25, and then be routed via DNT connection 45 to IP switch 41. Once at IP switch 41, it may be distributed via LAN 75 to either PC/VDU, 77 or 79. It should be noted that now, due to the intelligence added to DNT network 15 via the IDRPs, operates with logical equivalents of SCP 19. All of the routing intelligence and functions available in intelligent COST networks is now available in DNT network 15. In fact, due to the amorphous nature of the DNT network (highly interconnected), many functions can be provided in a more pervasive way than in the equivalent COST system.

Additional functionality by virtue of linked IDRPs running T-S software allows intelligent routing to be uniformly controlled across different platforms. For example, if node IP 23 is of a differing manufacture than IP node 25 and under normal conditions some functionality, such a QoS functionality, is not available on one of the nodes, it can be provided via software executing on the IDRP. In this way routing and all other functions become switch-independent. Moreover, with the use of SS7 gateway 57, intelligent routing is seamlessly integrated between networks 13 and 15. IVR 47 may, as previously described, obtain information through caller interaction from callers of either network to aid routing.

It will be apparent to one with skill in the art that there may be many more IDRPs, IVRs, SS7 gateways, SCPs, IP nodes, and so on than is illustrated in this embodiment without departing from the spirit and scope of the present invention. The inventor chooses to illustrate a quantitative minimum of equipment and connections for the purpose of simplicity in description.

Intelligent routing rules as may be practiced in a communication center such as in center 17 may be implemented at the network level within DNT 15 as well as COST network 13 by virtue of digital network 36 and IDRP connections as taught above. In practice, incoming calls from either network (calls 21 and calls 27) are first processed at IVR 47. Depending on information obtained through interaction, it is determined how the calls will be routed. Such determinations are made by connected IDRPs according to enterprise rules. For example, if it is determined that a COST call 21 should be routed into DNT network 15 based on IVR information, then IDRP 31 running an instance of T-S 59 would command SCP 19 to route call 21 through gateway 57 by way of connections 53 and 55 into DNT 15. Conversion from Bellcore protocol to IP format is performed in gateway 57. Once the call arrives at node 25 for example, IDRP 35 running an instance of T-S 63 has received information from IDRP 31 that the call should be further routed to IP switch 41 over DNT connection 45, and on to PC/VDU 79 over LAN 75. In this case, communication center 17 may have a 1-800 number for callers that may be linked to IP switch 41. IVR 47 may verify the destination during interaction with the caller.

It should be appreciated as well, that the intelligence injected into DNT network 15 may have many uses, not the least of which is network-wide QoS. With many routing nodes CTI-enhanced as taught, and sharing traffic data and so on, routing may be done in a network-wide fashion instead f node-to-node, and much may be accomplished relative to bandwidth sharing and latency issues.

In another example, a DNT call arrives at IP node 25 with the caller using a 1-800 equivalent, and is routed on to IVR 47. It may be determined that caller 27 needs to be routed through COST network 13 as the I-800 equivalent number is to a COST connection such as telephony switch 39. IDRP 33 will send a command to node 23 to route the data packets through gateway 57 into the COST domain. Conversion from data packets to Bellcore signal is achieved in gateway 57. Once call 27 is at SCP 19, IDRP 31 confirms further routing to telephony switch 39 in communication center 17. In both cases, data obtained through IVR interaction may be sent to communication center 17 over digital network 36 and on to LAN 75, ultimately appearing on a designated agent's PC/VDU.

In other instances, COST calls may be kept in COST network 13 and DNT calls may be kept in DNT network 15. Because of the added intelligence afforded to IP nodes such as nodes 23 and 25 via connected IDRPs such as IDRPs 31 and 35, data-packets generic to an event may be held up in queue, caused to travel on one path instead of variable routes, and so on.

Additional intelligence added to digital network 36 may include real-time data network conditions, knowledge of quality of service (QoS) routes, routines for error routing, statistical-based routing, priority routing rules, skill-based routing rules, and so on. Digital network 36 may be a very large network comprising thousands of connected IP nodes and associated IDRPs (not every node needs an IDRP), IVRs, and SS7 gateways between networks. Digital network 36 may also link many geographically distant communication centers of varying capability. For example, a COST-only or DN-only communication center may be linked to digital network 36 and may practice the present invention as taught above.

Figure 2:
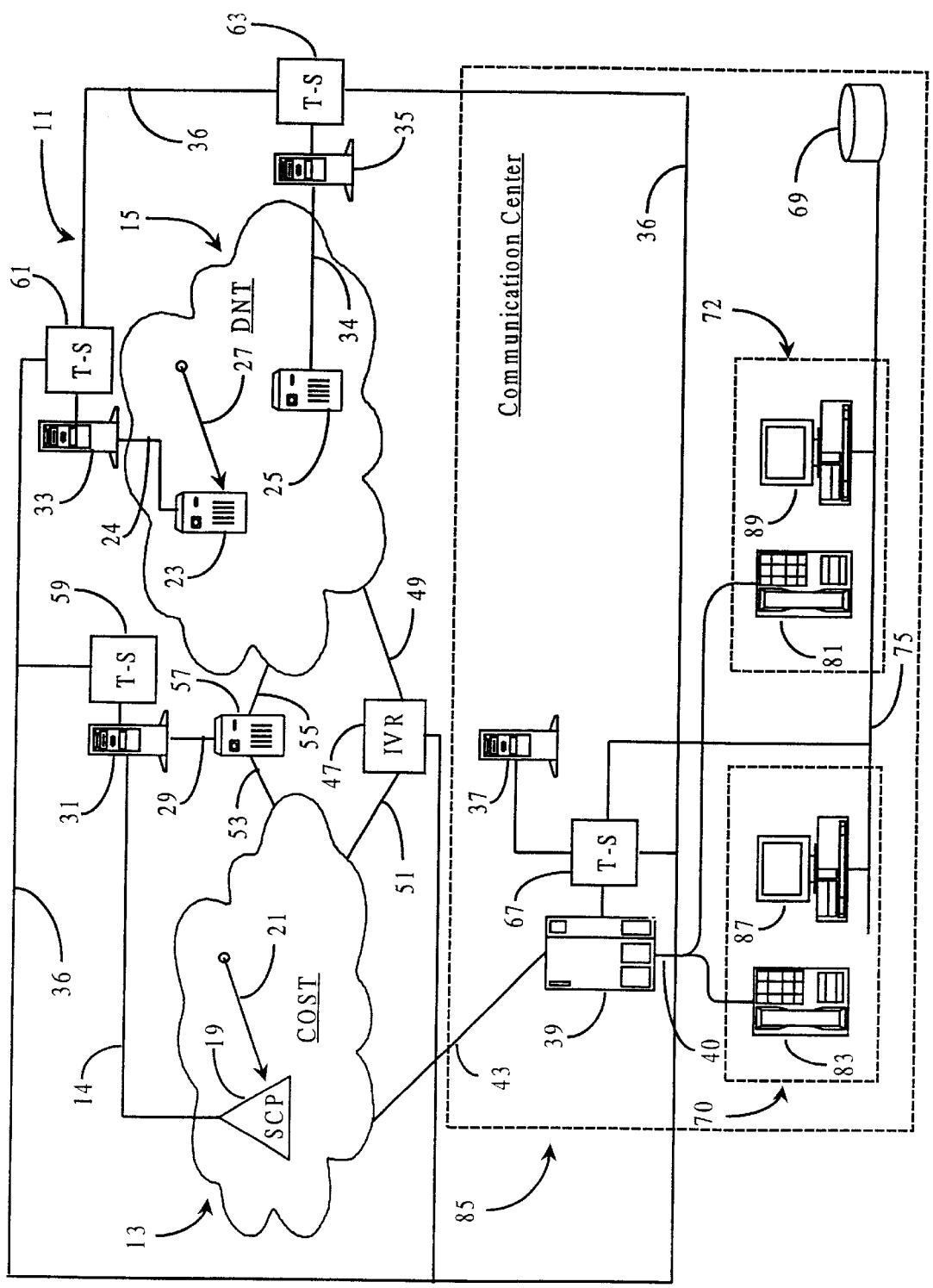
FIG. 2 is an overview of the communication network of FIG. 1 according to another embodiment of the present invention.

FIG. 2 is an overview of the communication network of FIG. 1 according to another embodiment of the present invention. Communication network 11, in this embodiment, is identical in virtually all respects to the communication center 11 of FIG. 1 except for an illustrated communication center 85 which accepts only COST calls. Therefore, elements of the present invention that have already been introduced with respect to FIG. 1 will not be re-introduced unless function has been altered according to an embodiment of the present invention.

Communication center 85, in this instance, is equipped to handle only COST calls. Therefore, equipment dedicated to handling DNT calls is not present. However, IDRP 37 of FIG. 1 is illustrated, but is only dedicated to the control of telephony switch 39. LAN 75 of FIG. 1 is also present here for receiving data ahead of a call as described with reference to FIG. 1. The LAN may also be used in the communication center for scripting to agents, agent training, and numerous other tasks.

In this embodiment, callers from DNT network 15 may be given a DNT 1-800 equivalent that is associated with telephony switch 39 of communication center 85. As described with reference to FIG. 1, DNT calls 27 (having the number identification) are intercepted via IVR 47 and interaction ensues. COST calls 21 are similarly intercepted via IVR 47.

In this case, all DNT calls to communication center 85 must be routed through SS7 gateway 57 and into COST network 13. IP node 23 is instructed via IDRP 33 to route call 27 through gateway 57 where it is converted to Bellcore signaling (COST standard). While call 27 waits at SCP 19 for further routing instruction, data regarding the call may be sent via digital network 36 to IDRP 37 and on to LAN 75. IDRP 31 instructs SCP 19 to route call 27 over trunk 43 to telephony switch 39. IDRP 37, in this case, may provide final routing instruction to telephony switch 39 as to which agent will take the call. Call 27 is then routed to a telephone of that agent such as telephone 83 in agent station 73. IDRP 37 has before, or at the same time that routing instructions were given to switch 39, routed IVR data regarding the call to a PC/VDU 87 which is associated with telephone 83, connected to LAN 75, and is adapted to display such information.

Destination numbers advertised to DNT callers may be to virtually any desired destination such as switch 39, SCP 19, a virtual queue (not shown), or other pre-assigned destinations. COST traffic may be routed through network 13 in normal fashion, except for an intercept via IVR 47 for the purpose of obtaining call-related data. By enhancing DNT network 15 with the method and apparatus of the present invention, COST communication center 85 may extend it's customer base to DNT callers without necessarily adding DNT equipment.

Figure 3:
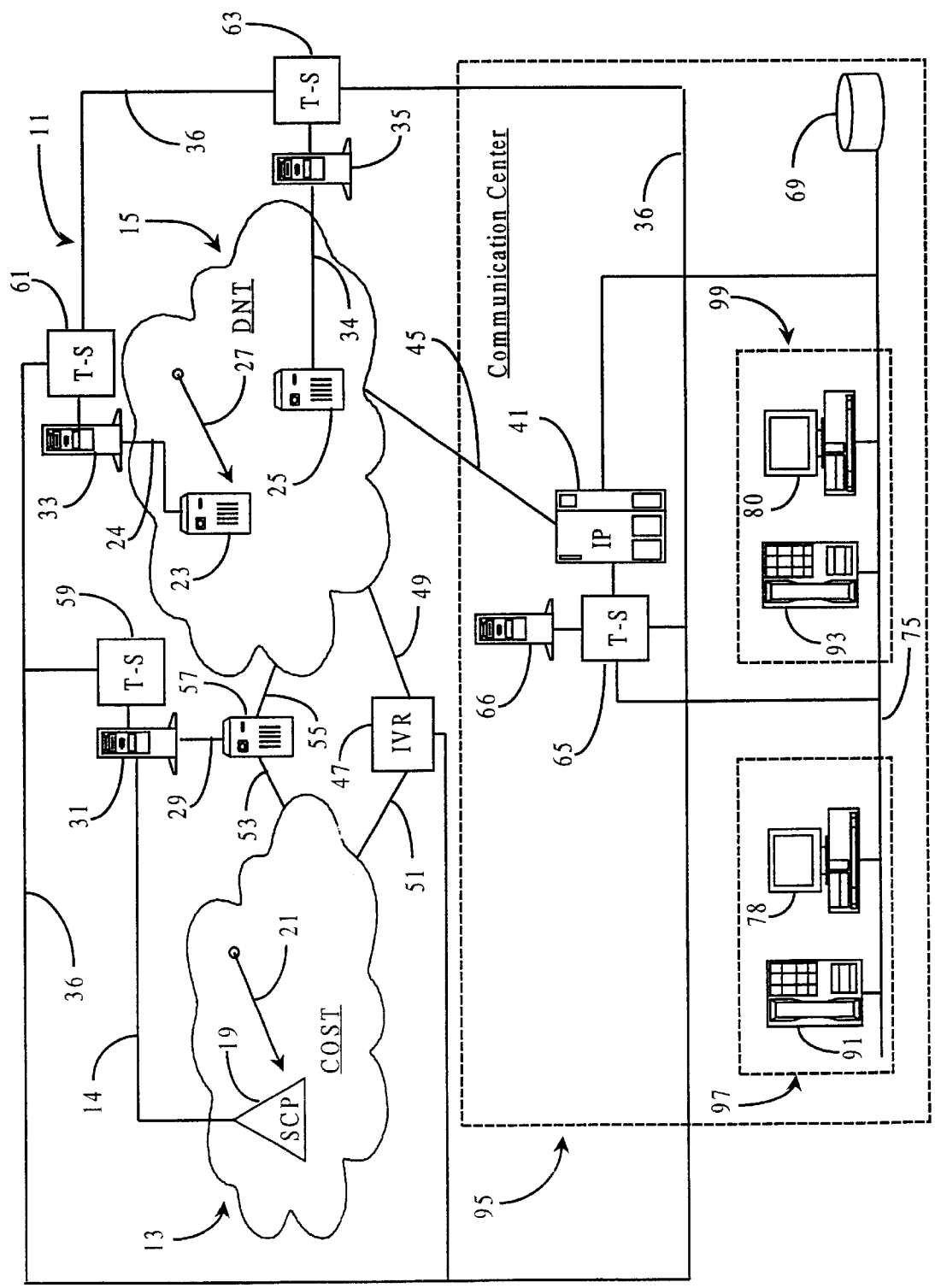
FIG. 3 is an overview of the communication center of FIG. 1 according to yet another embodiment of the present invention.

FIG. 3 is an overview of a communication system according to yet another embodiment of the present invention. Communication network 11, in this embodiment, is identical to the communication network 11 as represented with respect to FIGS. 2 and 1 except for a linked communication center 95 which accepts only DNT calls. Therefore, components of network 11 will not be reintroduced unless they have been functionally altered according to an embodiment of the present invention.

Communication center 95, as previously described, accepts only DNT calls. Therefore, previously described CTI COST telephony equipment such as was illustrated with respect to the embodiments of FIG. 1 and FIG. 2 is logically omitted. In this example, DNT communication center 95 may accept calls from both COST network 13 and DNT network 15.

With respect to COST calls arriving from network 13, they must be routed through SS7 gateway 57 and into DNT network 15 before being routed to communication center 95. By giving COST customers a special 1-800 number, calls 21 arrive at SCP 19 and are intercepted via IVR 47 as described in previous embodiments. After interaction with IVR 47, it may be determined that, for example, call 21 should be routed to IP node 25 within DNT network 15.

In this instance, call 21 is routed per instruction from IDRP 31 via trunk 51 and into gateway 47. Call 21 is then converted to DNT format (data-packets) and proceeds via DNT connection 49 to IP node 25. At IP node 25, IDRP 35 determines that call 21 should be further routed to IP switch 41 within communication center 95 via DNT connection 45. Data regarding call 21 as obtained during interaction with IVR 47 may be sent via digital network 36 to a connected IDRP 66 within center 95 for subsequent routing to a next-best available agent.

IDRP 66 is different from IDRP 37 of FIGS. 1 and 2 only in that it is adapted solely for handling DNT calls. Similarly, agent stations 97 and 99 differ from previously described stations in that they are specifically equipped for DNT communication and not for COST communication. For example, in workstation 97, a DNT telephone 97 is provided and adapted for DNT calls. In workstation 99, a DNT telephone 93 is similarly provided and adapted for DNT communication.

If it is determined by IDRP 66 to route call 21 to DNT 91, then IVR data regarding the call would be sent by IDRP 66 to PC/VDU 77 via LAN 75 ahead of, or at the time that call 21 is routed to phone 91 and so on. In this example, a DNT only communication center such as center 95 may increase it's exposure to include COST callers or customers. DNT network 15, now enhanced with routing intelligence, as taught herein and above, may accept all calls 21 from COST network 13 over SS7 gateway 57 wherein they are converted and further routed as normal DNT communication events.

It will be apparent to one with skill in the art that the communication network of the present invention may comprise many linked communication centers having one, or the other, or a mix of communication capability with regards to DNT and COST telephony. The different call center architectures of FIGS. 1, 2, and 3 may all be present and used in a single overall system in any quantity and mix. This will, in fact, typically be the case. The separate descriptions were only provided to avoid unnecessary complexity in drawings and descriptions.

It will also be apparent to one with skill in the art that the methods and apparatus of the present invention may be implemented over a large geographical region such as may be covered by a large DNT network such as the Internet. Equipment such as described IDRPs and digital connections comprising a separate digital network such as network 36 may be provided for lease, privately owned by one company, or collectively owned by several cooperating companies whose communication centers and corporate locations may be served.

Integrating routing intelligence between traditionally separate networks such as, for example, a COST network and the Internet, allows companies more options with regards to reaching broader customer bases and equipping individual communication centers for call handling. The spirit and scope of the present invention is limited only by the claims that follow.

What is claimed is:

1. An intelligent data-network telephony (DNT) packet-data network, comprising:
   wherein the application executing on the CTI server provide a Service Control Point (SCP) preprocessing and further routing of incoming DNT calls at the first IP Router;
   a first Internet protocol (IP) Router node connected to and within the packet-data network for receiving and routing data-network telephony (DNT) calls to and through other IP nodes;
   a computer-telephony integration (CTI) server connected to the first IP router by a dedicated data link enabling monitoring of transactions at the IP Router node and control of IP Router node functions;
   telephony applications executing on the CTI Server; and
   a DNT-capable Interactive Voice response (IVR) unit connected to the first IP Router;
   wherein the SCP connects the callers on the incoming DNT calls to the IVR, which elicits information from the callers, and the SCP uses the elicited information to further route the calls.

2. The intelligent DNT network of claim 1 further comprising a protocol-translating bridge connected on the intelligent DNT network and to a dedicated-connection telephony network, wherein calls after IVR processing, based on the elicited information, are routed over the bridge and into the dedicated-connection network.

3. The intelligent DNT network of claim 1 wherein the DNT network is the Internet.

4. The intelligent DNT network of claim 3 wherein the dedicated-connection network is a publicly-switched telephony network (PSTN).

5. An intelligent data-network telephony (DNT) packet-data network, comprising:
   a first Internet protocol (IP) Router connected to the packet-data network for receiving and routing data-network telephony (DNT) calls;
   a computer-telephony integration (CTI) server connected to the first IP router by a dedicated data link enabling monitoring of transactions at the IP Router and manipulation of IP Router functions;
   telephony applications executing on the CTI Server; and
   at least one call center implemented at a customer premise, the call center comprising a second IP router enhanced by a CTI processor, the second IP router connected to the DNT network and to plural agent stations each having an IP-capable telephone coupled to the second IP router;
   wherein the executing applications provide a Service Control Point (SCP) for preprocessing and further routing of the incoming DNT calls at the first IP Router and wherein a call routed by the SCP to the second IP router may be further routed by action of the CTI processor to an agent at a selected one of the agent stations.

6. The intelligent DNT network of claim 5 wherein the IP-capable telephones are implemented on computer stations having video display units (PC/VDUs) at the agent stations, and wherein the PC/VDUs are coupled to the second IP router and to the CTI processor by a local area network (LAN).

7. A method for transforming a packet data network having interconnected Internet protocol (IP) router nodes for receiving and routing data-network telephony (DNT) calls, into an intelligent data network telephony network, comprising steps of:
   (a) enhancing individual ones of the IP router nodes in the network by connecting a computer-telephony integration (CTI) server to one or more of the IP router nodes; and
   (b) using the CTI servers to monitor activities at the connected IP router nodes, including DNT calls received;
   (c) commanding functions of the connected IP router nodes by the CTI servers, including routing of DNT calls received by the enhanced IP routers, based on the activities monitored; and
   assigning IP addresses for one or more enhanced IP routers as no-charge-to-calling-party destinations, and rerouting calls by the CTI processor based upon association of the no-charge-to-calling-party IP addresses with IP addresses of enterprises sponsoring the no-charge-to-calling-party IP addresses.

8. The method of claim 7 wherein one or more enterprises each maintain a call center comprising a CTI-enhanced IP router connected to IP-capable telephones at agent stations, and comprising a step for further routing a call routed to one of the call centers to an IP-capable telephone at the agent station.

* * * * *

UNITED STATES PATENT AND TRADEMARK OFFICE
CERTIFICATE OF CORRECTION

PATENT NO.    : 6,731,626 B1
DATED         : May 4, 2004
INVENTOR(S)   : Igor Neyman Page 1 of 1

It is certified that error appears in the above-identified patent and that said Letters Patent is hereby corrected as shown below:

Column 13,
Line 36, claim 1, should read:
1. An intelligent data-network telephony (DNT) packet-data network, comprising:
 a first Internet Protocol (IP) Router node connected to and within the packet-data network for receiving and rounting data-network telephony (DNT) calls to and through other IP nodes;
 a computer-telephony integration (CTI) server connected to the first IP router by a dedicated data link enabling monitoring of transactions at the IP Router node and control of IP Router node functions;
 telephony applications executing on the CTI Server; and
 a DNT-capable Interactive Voice response (IVR) unit connected to the first IP Router;
 wherein the applciation executing on the CTI server provides a Service Contol Point (SCP) preprocessing and further routing incoming DNT calls at the first IP router, and wherein the SCP connects the callers on the incoming DNT calls to the IVR, which elicits information from the callers, and the SCP uses the elicited information to further route the calls.

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,731,626 B1
DATED : May 4, 2004
INVENTOR(S) : Igor Neyman

Page 1 of 1

It is certified that error appears in the above-identified patent and that said Letters Patent is hereby corrected as shown below:

Column 13,
Line 36, claim 1, reads:

1. An intelligent data-network telephony (DNT) packet-data network, comprising:
    wherein the application executing on the CTI server provide a Service Control Point (SCP) preprocessing and further routing of incoming DNT calls at the first IP router;
    a first Internet Protocol (IP) Router node connected to and within the packet-data network for receiving and routing data-network telephony (DNT) calls to and through other IP nodes;
    a computer-telephony integration (CTI) server connected to the first IP router by a dedicated data link enabling monitoring of transactions at the IP Router node and control of IP Router node functions;
    telephony applications executing on the CTI Server; and
    a DNT-capable Interactive Voice response (IVR) unit connected to the first IP Router;
    wherein the SCP connects the callers on the incoming DNT calls to the IVR, which elicits information from the callers, and the SCP uses the elicited information to further route the calls.

should read:

1. An intelligent data-network telephony (DNT) packet-data network, comprising:
    a first Internet Protocol (IP) Router node connected to and within the packet-data network for receiving and routing data-network telephony (DNT) calls to and through other IP nodes;
    a computer-telephony integration (CTI) server connected to the first IP router by a dedicated data link enabling monitoring of transactions at the IP Router node and control of IP Router node functions;
    telephony applications executing on the CTI Server; and
    a DNT-capable Interactive Voice response (IVR) unit connected to the first IP Router;
    wherein the application executing on the CTI server provides a Service Control Point (SCP) preprocessing and further routing incoming DNT calls at the first IP router, and wherein the SCP connects the callers on the incoming DNT calls to the IVR, which elicits information from the callers, and the SCP uses the elicited information to further route the calls.

Signed and Sealed this

Fifth Day of October, 2004

JON W. DUDAS
*Acting Director of the United States Patent and Trademark Office*